US009781744B1

(12) United States Patent
Tenny et al.

(10) Patent No.: US 9,781,744 B1
(45) Date of Patent: Oct. 3, 2017

(54) SYSTEM AND METHOD FOR UPLINK DATA SCHEDULING FOR GRANT FREE TRANSMISSION

(71) Applicant: Futurewei Technologies, Inc., Plano, TX (US)

(72) Inventors: Nathan Edward Tenny, Poway, CA (US); Mazin Ali Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/280,443

(22) Filed: Sep. 29, 2016

Related U.S. Application Data

(60) Provisional application No. 62/373,675, filed on Aug. 11, 2016.

(51) Int. Cl.
*H04W 4/00* (2009.01)
*H04W 74/04* (2009.01)
*H04L 5/00* (2006.01)
*H04W 72/12* (2009.01)
*H04W 88/02* (2009.01)

(52) U.S. Cl.
CPC ........... *H04W 74/04* (2013.01); *H04L 5/0053* (2013.01); *H04W 72/12* (2013.01); *H04W 88/02* (2013.01)

(58) Field of Classification Search
None
See application file for complete search history.

(56) References Cited

U.S. PATENT DOCUMENTS

| 7,778,151 B2 | 8/2010 | Bertrand et al. | |
|---|---|---|---|
| 2012/0182977 A1* | 7/2012 | Hooli | H04W 72/1278 370/336 |
| 2013/0051269 A1* | 2/2013 | Suzuki | H04L 1/1812 370/252 |
| 2014/0254544 A1* | 9/2014 | Kar Kin Au | H04L 5/0033 370/330 |

(Continued)

FOREIGN PATENT DOCUMENTS

WO   2011093270 A1   8/2011

OTHER PUBLICATIONS

3GPP TS 36.321 V13.2.0 (Jun. 2016); 3rd Generation Partnership Project; Technical Specification Group Radio Access Network; Evolved Universal Terrestrial Radio Access (E-UTRA); Medium Access Control (MAC) Protocol Specification (Release 13), Valbonne—France, 91 pages.
Huawei, HiSilicon, "Consideration on grant free transmission for NR", 3GPP TSG-RAN WG2 Meeting #94, R2-164131, Nanjing, China, May 23-27, 2016, 9.4.3.2.5, 3 pages.
Ericsson, "Multiplexing in MAC for NR", 3GPP TSG-RAN WG2 #94, Tdoc R2-164024, Nanjing, P.R. China, May 23-27, 2016, 9.4.2, 3 pages.
Au et al., "Uplink Contention Based SCMA for 5G Radio Access", Huawei Technologies Canada Co., Ltd., 6 pages.
Metis deliverable D2.4, "Mobile and Wireless Communications Enablers for the Twenty-Twenty Information Society (METIS)", Proposed Solutions for New Radio Access, Document No. ICT-317669-METIS/D2.4, Feb 28, 2015, (sec. 3.11.1.2, 3.12.1) 190 pages.
Nikaein, N., "Latency, Cooperation, and Cloud in Radio Access Network". Thesis, Université Nice, Mar. 19, 2015, 167 pages.

*Primary Examiner* — Edan Orgad
*Assistant Examiner* — Rebecca Song
(74) *Attorney, Agent, or Firm* — Slater Matsil, LLP

(57) ABSTRACT

A method and system provide determining whether to pursue grant free transmission in accordance with a size of at least one packet in a first buffer of at least one buffer and determining a size of a grant free transport block (GFTB) in accordance with a configuration of radio resources available for grant free transmission in instances where grant free transmission is to be utilized. The method also includes populating the GFTB with first data from at least one of the buffers to produce a populated GFTB and transferring the GFTB from a media access control (MAC) layer to a physical layer (PHY).

20 Claims, 10 Drawing Sheets

(56) References Cited

U.S. PATENT DOCUMENTS

2015/0237644 A1* 8/2015 Golitschek Edler von Elbwart ......... H04W 72/12 370/329
2016/0100430 A1* 4/2016 Dabeer ............. H04W 28/0278 370/329
2017/0041981 A1* 2/2017 Kela .................... H04W 72/00

* cited by examiner

SYSTEM AND METHOD FOR UPLINK DATA SCHEDULING FOR GRANT FREE TRANSMISSION

CROSS-REFERENCE TO RELATED APPLICATIONS

This application claims the benefit of U.S. Provisional Application No. 62/373,675, filed on Aug. 11, 2016, which application is hereby incorporated herein by reference.

TECHNICAL FIELD

The present invention relates generally to a system and method for wireless communications, and, in particular embodiments, to a system and method for uplink data scheduling for grant free transmission.

BACKGROUND

Fifth generation (5G) new radio (NR) transmission systems may include grant free uplink transmissions as a feature. In grant free uplink transmission, packets are transmitted without waiting for a grant of resources for the uplink. Grant free uplink transmission may be used for internet of things (IoT) and other scenarios to increase capacity. Grant free uplink may be especially beneficial for intermittent small packets, e.g., occasional reports from a sensor or other device, keep-alive packets from an application, or the like. There may be some services which regularly use grant free transmission, and other services that have a mix of small packets suitable for grant free transmission and larger data blocks that require an uplink grant for acceptable performance.

In some cases, there may be specific services or specific data flows that are unconditionally configured to use grant-free transmission. Accordingly, a grant free mechanism may be used for the channels corresponding to these services or flows, resulting in a class of logical channels assigned specifically to carry grant free transmissions. When certain logical channels are assigned to grant free use, the grant free logical channels have a separate scheduler that uses only the grant free physical layer (PHY) resources, i.e., the portion of physical layer resources in the system that are permitted to be occupied by grant free transmissions. Such PHY resources may be characterized as a subset of the radio resources, defined for example by timing, carrier or subcarrier frequency, code assignment, and so on.

SUMMARY

In accordance with an embodiment, a method includes determining whether to pursue grant free transmission in accordance with a size of at least one packet in a first buffer of at least one buffer and determining a size of a grant free transport block (GFTB) in accordance with a configuration of radio resources available for grant free transmission in instances where grant free transmission is to be utilized. The method also includes populating the GFTB with first data from at least one of the buffers to produce a populated GFTB and transferring the GFTB from a media access control (MAC) layer to a physical layer (PHY).

In accordance with an embodiment, a user equipment (UE) includes a processor and a non-transitory computer readable storage medium storing programming for execution by the processor. The programming includes instructions for determining whether to pursue grant free transmission in accordance with a size of at least one packet in a first buffer of at least one buffer and determining a size of a grant free transport block (GFTB) in accordance with a configuration of radio resources available for grant free transmission. The programming also includes instructions for upon determining to pursue grant free transmission, populating the GFTB with first data from the first buffer to produce a populated GFTB and transferring the GFTB from a media access control (MAC) layer to a physical layer (PHY).

In accordance with an embodiment, a non-transitory computer readable storage medium storing programming for execution by a processor, the programming includes instructions for determining whether to pursue grant free transmission in accordance with a size of at least one packet in at least one buffer and determining a size of a grant free transport block (GFTB) in accordance with a configuration of radio resources available for grant free transmission. The programming also includes instructions for upon determining to pursue grant free transmission, populating the GFTB with first data from the at least one buffer to produce a populated GFTB and transferring the GFTB from a media access control (MAC) layer to a physical layer (PHY).

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
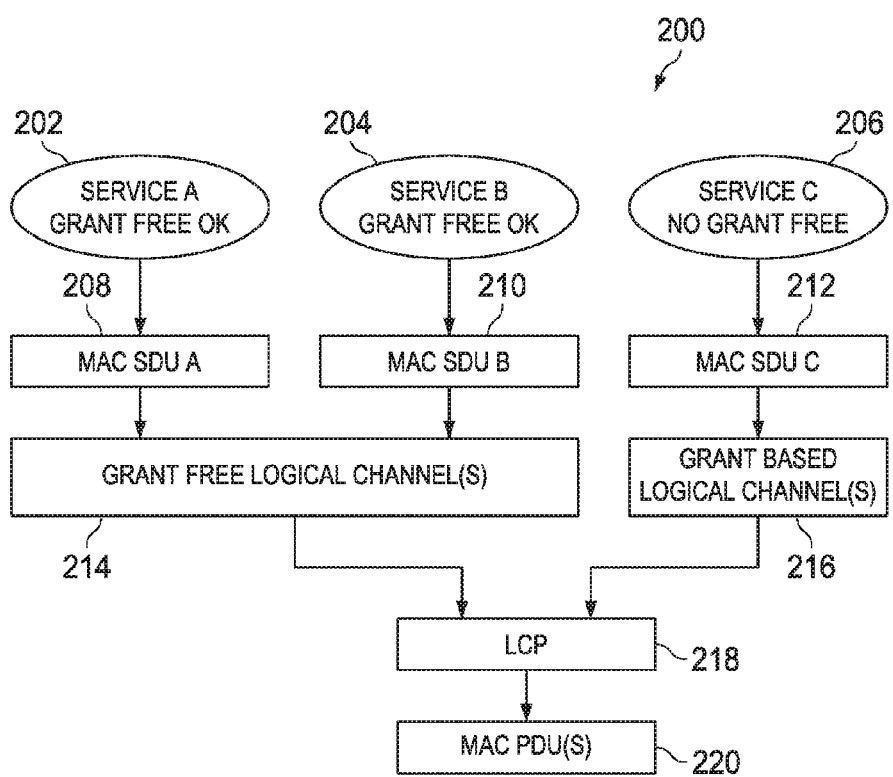
FIG. 1 illustrates a logical media access control (MAC) structure for grant free scheduling.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In long term evolution (LTE) transmission systems, uplink scheduling is performed. Data queues in the UE are populated with data waiting for transmission. There may be one queue per logical channel, although UE implementation details may vary. In other examples, there is more than one queue per logical channel, or more than one logical channel per queue. Based on the condition of the queues, the UE may issue a scheduling request to a network to receive an uplink grant. When an uplink grant is received from the network, the UE populates the data transmission from data in the queues, filling the transport block size in the grant with data from the logical channels in order of priority. The data is then transmitted in an uplink transmission.

When there is not yet a grant which has been received and not fulfilled, there is no transport block to populate. Grant based logical channel prioritization procedures, e.g., the logical channel prioritization procedures specified in LTE, assume a grant has been provided, and deliver data to fill the grant, often leaving data in the queues. Grant-free logic does not send a scheduling request, but instead creates a grant free transmission. The block size to be populated is based on the grant free configuration and/or data in the queues, not on a transport block size configured by a grant as in grant based logic. Additional data which arrives while the grant free transmission is being built must be dealt with, especially when the newly arriving data is higher priority data than the data already used to populate the block.

A criterion for determining when data should be sent grant free may be based on a number of considerations, such as packet size, buffer size, buffer state, and other criteria, such as the type of logical channel. Grant free transmission based on packet size provides flexibility for bearers with variable data rates. Data services may end up with multiple types of data multiplexed in a single logical channel, or even in a single flow. For example, an instant messaging (IM) client may use the same bearer/logical channel for message data, which has potentially large packets, and keep-alive packets, which are small packets. In such a case, the small packets may be well suited for grant free transmission, because they fit small allocations, while the larger packets for message data may be too large to be delivered grant free with acceptable packet error rates, and/or may be too large for the block size configured by the system for grant free transmission. Grant free transmission reduces lag time because the transmission can be transmitted on the next grant free uplink opportunity, without waiting for a grant. Additionally, grant-free transmission reduces bandwidth by not using grant request and grant response messages. However, grant free transmission may involve a possibility of contention between different transmitters, resulting in data loss.

Some logical channels may be poorly suited for grant free use. For example, a grant free configuration might not meet reliability criteria for a logical channel, due to the danger of contention. Accordingly, certain logical channels may be prohibited from grant free use. The prohibition may originate from the user equipment (UE), the network, or both the UE and the network, and the prohibition may be specified in advance. Alternatively, the prohibition may be decided based on implementation criteria. At any time, the UE uplink scheduler, or a configuring entity in the network, may evaluate a logical channel and determine whether grant free use is permissible.

In an embodiment, a grant free mechanism is used based on packet size. The media access control (MAC) layer performs uplink scheduling using grant free and grant based uplink packet scheduling procedures. In an embodiment, a layer 2 mechanism schedules transmissions from UEs with no uplink grant. Small packets may be transmitted grant free, while large packets are transmitted grant based.

FIG. 1 illustrates the MAC structure 200 for grant free scheduling based on logical channels. Service A 202 and service B 204 both allow grant free transmission, while service C 206 does not allow grant free transmission. Service C 206 uses separate radio resources, e.g., radio resources not made available for grant free transmission, for each grant. Service A 202 queues MAC service data unit (SDU) A 208 for uplink transmission, service B 204 queues MAC SDU B 210 for uplink transmission, and service C 206 queues MAC SDU C 212 for uplink transmission. MAC SDU A 208 and MAC SDU B 210 use grant free logical channels, while MAC SDU C 212 uses grant based logical channels. Logical channel prioritization (LCP) 212 is performed based on the grant free logical channels 214 and the grant based logical channels 216. MAC protocol data units (PDUs) 220, corresponding to transport blocks for physical layer transmission, are formed based on the LCP 218.

Figure 2:
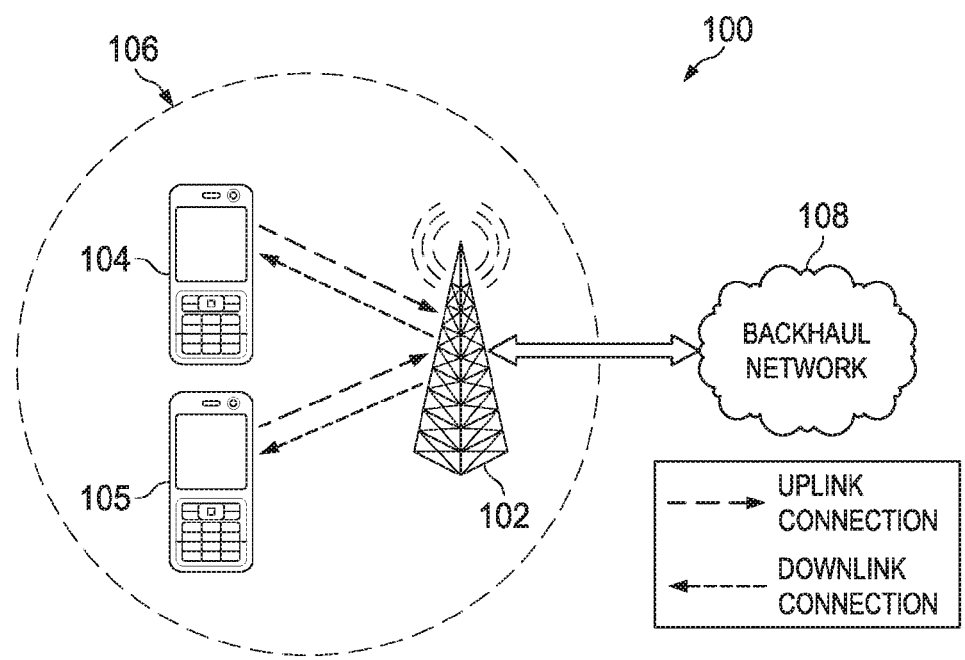
FIG. 2 illustrates a diagram of a wireless network for communicating data associated with some embodiments.

FIG. 2 illustrates a network 100 for communicating data according to some embodiments. Network 100 includes communications controller 102 having a coverage area 106, a plurality of UEs, including UE 104 and UE 105, and backhaul network 108. In this embodiment, two UEs are depicted, but many more may be present. Communications controller 102 may be any component capable of providing wireless access by establishing uplink (dashed line) and/or downlink (dotted line) connections with UE 104 and UE 105, such as a base station, a NodeB, an enhanced nodeB (eNB), an access point, a picocell, a femtocell, relay node, and other wirelessly enabled devices. Uplink data transmission may be grant based or grant free. UE 104 and UE 105 may be any component capable of establishing a wireless connection with communications controller 102, such as user equipments (UEs), cell phones, smart phones, tablets, sensors, or the like. Backhaul network 108 may be any component or collection of components that allow data to be exchanged between communications controller 102 and a remote end. In some embodiments, the network 100 may include various other wireless devices, such as relays, or the like.

Figure 3:
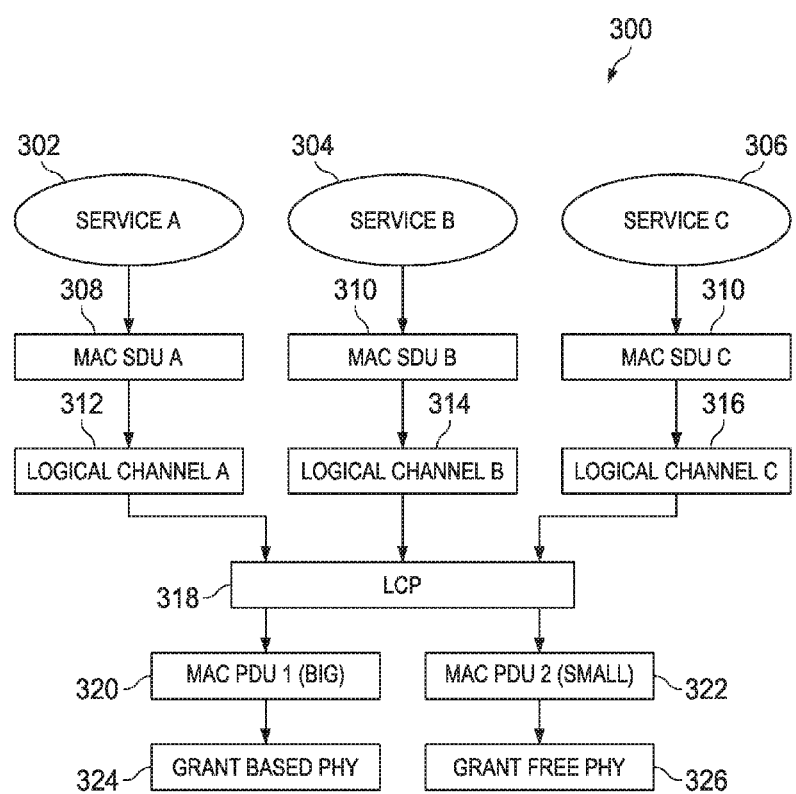
FIG. 3 illustrates an embodiment MAC structure for grant free scheduling.

FIG. 3 illustrates a MAC data processing procedure 300 for grant free scheduling based on packet or buffer size. Multiple services, service A 302, service B 304, and service C 306, use different logical channels, but are scheduled together. Service A 302 queues MAC SDU A 308 for uplink transmission, service B 304 queues MAC SDU B 310 for uplink transmission, and service C 306 queues MAC SDU C 310 for uplink transmission. MAC SDU A 308 corresponds to logical channel A 312, MAC SDU B 310 corresponds to logical channel B 314, and MAC SDU C 310 corresponds to logical channel C 316.

The LCP 318 performs uplink scheduling for logical channel A 312, logical channel B 314, and logical channel C 316. The LCP 318 generates MAC PDUs of various sizes, which may then be separated for grant free transmission and grant based transmission. Some logical channels may have latency requirements which are respected by the LCP 318 during scheduling. Some logical channels may disallow grant free transmission by the LCP 318. A protocol layer, including an LCP engine, generates PDUs from SDUs. When a MAC layer handles packet data, the SDUs may be referred to as packets. Some PDUs, for example large PDUs, such as MAC PDU 1 320, are assigned for grant based transmission, while other PDUs, for example small PDUs, such as MAC PDU 2 322, are assigned for grant free transmission. The packets are passed to the PHY layer. MAC PDU 1 320 is passed to a grant based PHY 324, while MAC PDU 2 322 is passed to a grant free PHY layer 326.

An embodiment provides for the logical channel prioritization aspects of uplink scheduling, and may, in some embodiments, be compatible with a model from LTE. A UE uplinks data from one or more service carries over a logical channel. In conventional grant based operation, the scheduler requests a grant from a network. Next, the network issues a grant, including parameters of a transport block (TB) that the UE will be approved to send. Then, the UE populates the TB according to the priorities of the channels. Each logical channel may have its own queue of data to be scheduled. Data may be processed from the queues based on priority, so higher priority data is transmitted sooner. Different UEs may implement the uplink details differently, albeit resulting in the same scheduling output for a given set of inputs.

Some logical channels may have a requirement on latency. In an example, latency requirements of logical channels are satisfied in a grant free approach. Some logical channels may be forbidden from grant free use. For example, some logical channels may require the use of grants to prevent contention and guarantee service. In an embodiment, configuration for constructing a grant free uplink transport block is known to the UE in advance. The configuration may, for example, be received in a previous message from the communications controller. Alternatively, the configuration is installed on the UE. The configuration may include modulation and coding state (MCS) configuration, maximum TB size, and other characteristics for grant free uplink. Reliability and/or retransmission are provided by a radio link control (RLC) protocol, and the MAC layer does not need to consider whether a grant free transmission is successfully received.

Grant free transmission may be considered in the same loop in which the UE evaluates whether to send a scheduling request (SR). When incoming data arrives for uplink transmission, the UE evaluates whether the data will be sent on a grant free transmission or a grant based transmission. In one example, the UE determines whether the state of the uplink data buffers is compatible with grant free transmission. The state of the uplink data buffers may be compatible with grant free transmission when data in the buffers, excluding those not considered for grant free use, is sufficiently small, and the data adds up to less than the size allowed for grant free transport blocks. In some examples, the UE may allow populating a transport block with data from some, but not all, services. For example, if there is a small packet from one service and a large packet from another service, the small packet may be sent by itself in grant free transmission, while the large packet is sent in grant based transmission.

In an embodiment, the scheduler builds a grant free transport block (GFTB) with data from the uplink buffers, without obtaining a grant. PHY parameters, such as size and MCS, are set according to the grant free configuration. Once populated, the GFTB can be submitted to the PHY for transmission on grant free radio resources. Data not assigned to grant free transmission goes to the conventional LCP for grant based transmission.

Figure 4:
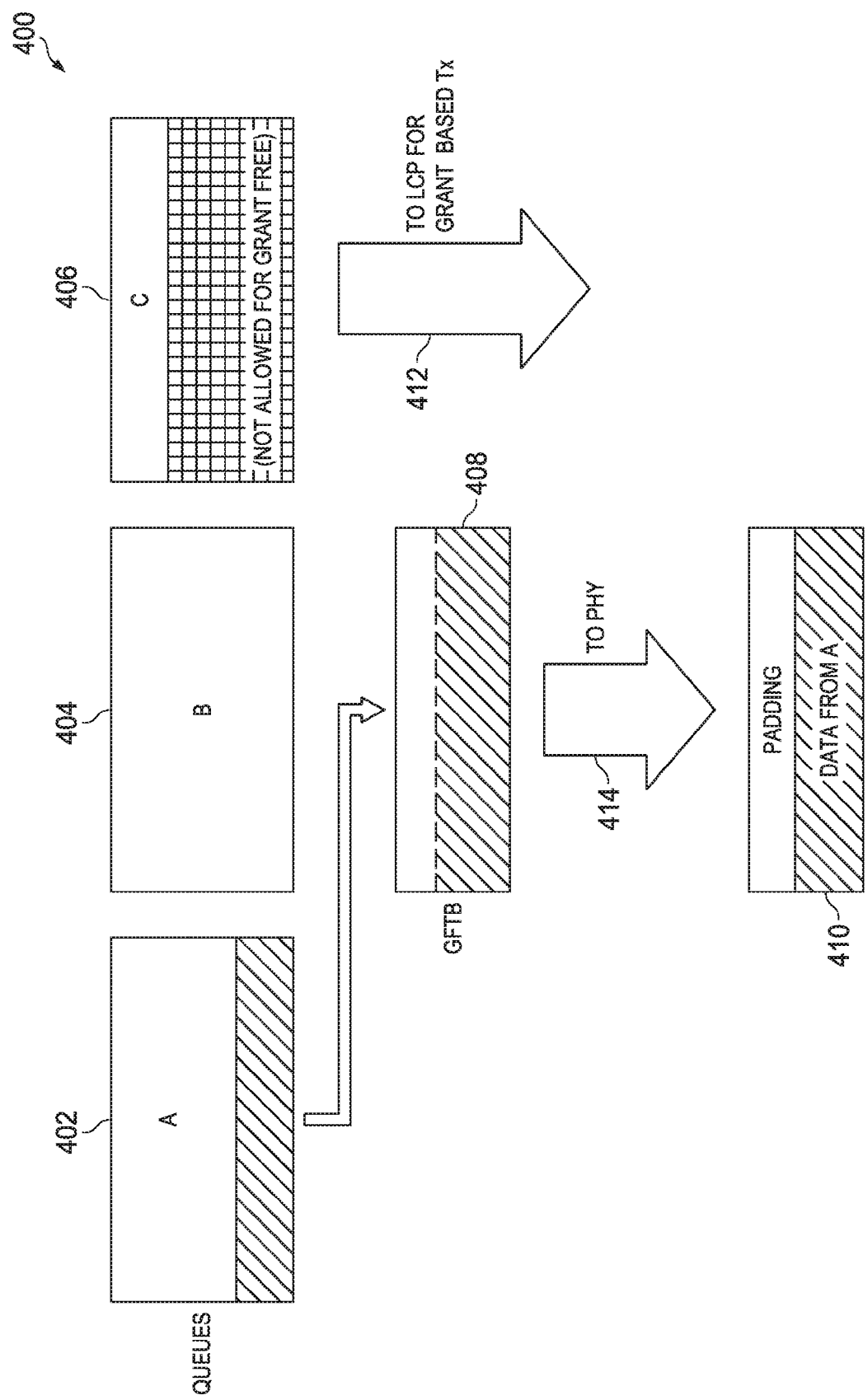
FIG. 4 illustrates grant free and grant based uplink transmission according to some embodiments.

FIG. 4 illustrates grant free and grant based transmission 400 according to some embodiments. Queue C 406 has data which is not allowed for grant free transmission. This data is sent to the LCP for grant based transmission 412. Queue B 404 is another queue that, at the time illustrated, contains no data. Queue A 402 contains data which is allowed to be transmitted in a grant free transmission. The data is read into the GFTB 408, a logical transport block object. The GFTB is submitted to the PHY layer 414. Padding is added to data from queue A 402 to complete populating the GFTB 410.

A scheduler operates on MAC SDUs similarly to logical channel prioritization. Available grant free uplink resources may be restricted in time. For example, if it will be a long time before grant free transmission will be approved to occur, a GFTB may not be built, because it may be faster to use grant based transmission. Additionally, the proximity to SR occasions may be considered. For example, when an SR occasion is soon, grant free transmission might not be used, because it may be faster to wait for a grant than to utilize grant free transmission. The time criterion may be service dependent. For example, machine type communications (MTC) may prefer grant free transmission to avoid SR overload. MTC may also have low latency requirements. On the other hand, services that need to be reliable, such as mobile gaming, video rendering, remote control, and safety monitoring, cloud connectivity, and vehicle-to-vehicle wireless communications, may preferably use grant based transmission.

Often, in grant free and grant based transmission, when not all of the queue contents will fit in a GFTB, the scheduler generally will not attempt to build a GFTB. In some examples, the scheduler builds a GFTB when the queue contents will not fit in a GFTB. For example, high priority data may be sent grant free, and the remaining data may be queued for grant based transmission. Later, a grant is requested for the remaining data.

Additional data may arrive while the GFTB is being built. In one example, the GFTB being built is sent without adding the additional data, and the additional data is scheduled for uplink transmission at a later time. In another example, the GFTB is aborted, and the prioritization process is restarted with the original data and the additional data. In an additional example, the new data is added to the GFTB when space permits, and the remaining data is left in the queues.

In an example of grant free and grant based transmission, an SR is not sent while the GFTB is being built, because receiving a grant during the GFTB building phase may create a clash between the LCP and GFTB. When the LCP is waiting for a grant, GFTB building may be delayed until the grant has been received. In some situations, a GFTB is still built while the LCP waits for a grant, for example when there is a service specific grant. For example, a GFTB may be built for service A while waiting for a grant for service B.

An embodiment method of uplink data scheduling is performed by the uplink scheduler of a UE. When grant free transmission is prohibited, either permanently or temporarily, the uplink scheduler does not perform grant free transmission. Grant free transmission may be prohibited, for example, because of network policy, because the UE is already waiting for a grant, or because the time until the next grant free transmission opportunity exceeds a threshold.

When the buffer contents are not compatible with grant free use, regular scheduling is performed. When the buffer contents are compatible for grant free transmission, grant free transmission is performed. LCP is performed, and the output TB size is equal to the GFTB size. Data from any buffers that are not allowed for grant free transmission is excluded. When the output PDU satisfies conditions for grant free transmission, the PDU is passed to the PHY layer for transmission on grant free resources. On the other hand, when the output PDU does not meet the conditions for grant free transmission, the data is restored to the buffers for scheduling. When SR inhibition has been used, the SR inhibition is released. Inhibiting SR transmission may prevent a race condition between grant free transmission and grant based transmission. Data arriving before the GFTB is transmitted could trigger sending an SR. This may result in out of order data delivery, without respecting the LCP.

Figure 5:
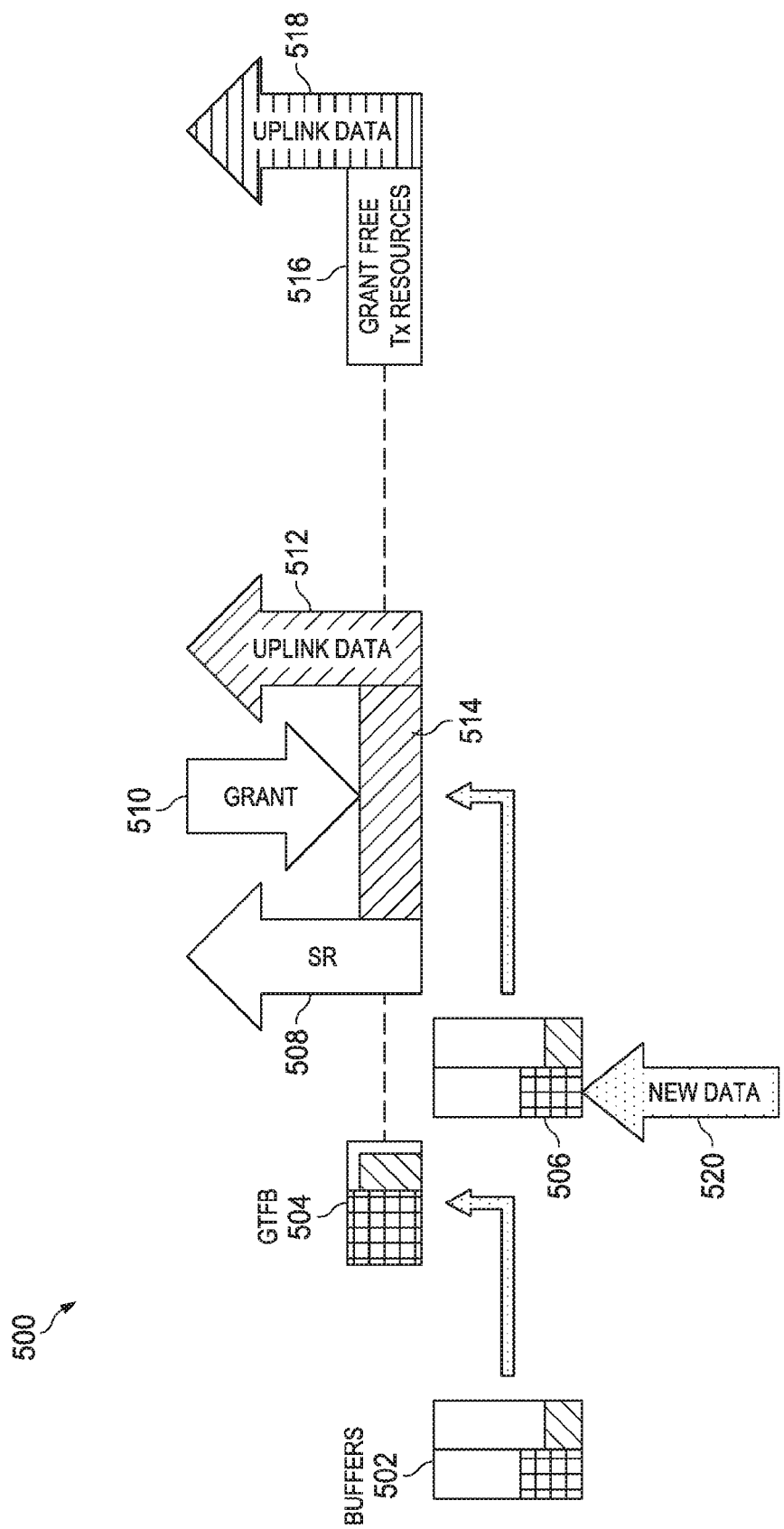
FIG. 5 illustrates out of order data transmission associated with some embodiments.

FIG. 5 illustrates a procedure 500 for handling out of order data delivery according to some embodiments. Initially, there is data in the buffers 502. This initial data is placed in a GFTB 504 for grant free transmission. After the GFTB 504 has been formed, but before the grant free transmission, new data 520 arrives and is placed in the buffer 506. The new data is too big for the GFTB 504. Also, the new data has a lower priority than the data in the GFTB 504. An SR 508 is transmitted and requests a grant opportunity. In response to the SR 508, a grant 510 is received, and the new data 514 is transmitted as uplink data 512.

At a later time, grant free transmission (Tx) resources 516 are available, and the data in the GFTB 504 is transmitted as uplink data 518. In this example, the data is delayed because it is transmitted grant free.

To prevent the out of order data transmission, SR transmissions may be prevented from being transmitted while a GFTB is being constructed. However, this approach delays the later arriving data, and does not benefit the initial data. In another example, GFTB formation is prohibited when an SR occasion is before the next grant free transmission resources.

Embodiments of a system for uplink data scheduling may provide for a recovery method for when the constructed MAC PDU does not fit in the GFTB. This may be caused by a race condition which adds data to the buffer, a reconfiguration which changes the grant free parameters before the next grant free transmission occasion, or other causes.

To recover the data in the case that the constructed MAC PDU does not fit in the GFTB, or that after the MAC PDU has been constructed grant free transmission is not available for it, the UE restores the data to the buffer, so it can be considered for future scheduling. A variety of methods may be used to restore the data. In one example, when populating the GFTB, a copy of the buffer is made. Data from the copied buffer is placed in the GFTB. Data arriving after the buffer has been copied is placed behind the original data in the original buffer. In the event that the GFTB fails, the copy of the buffer is discarded. In the event that the GFTB succeeds, the data is removed from the original buffer, and the new data remains in the original buffer.

Figure 6:
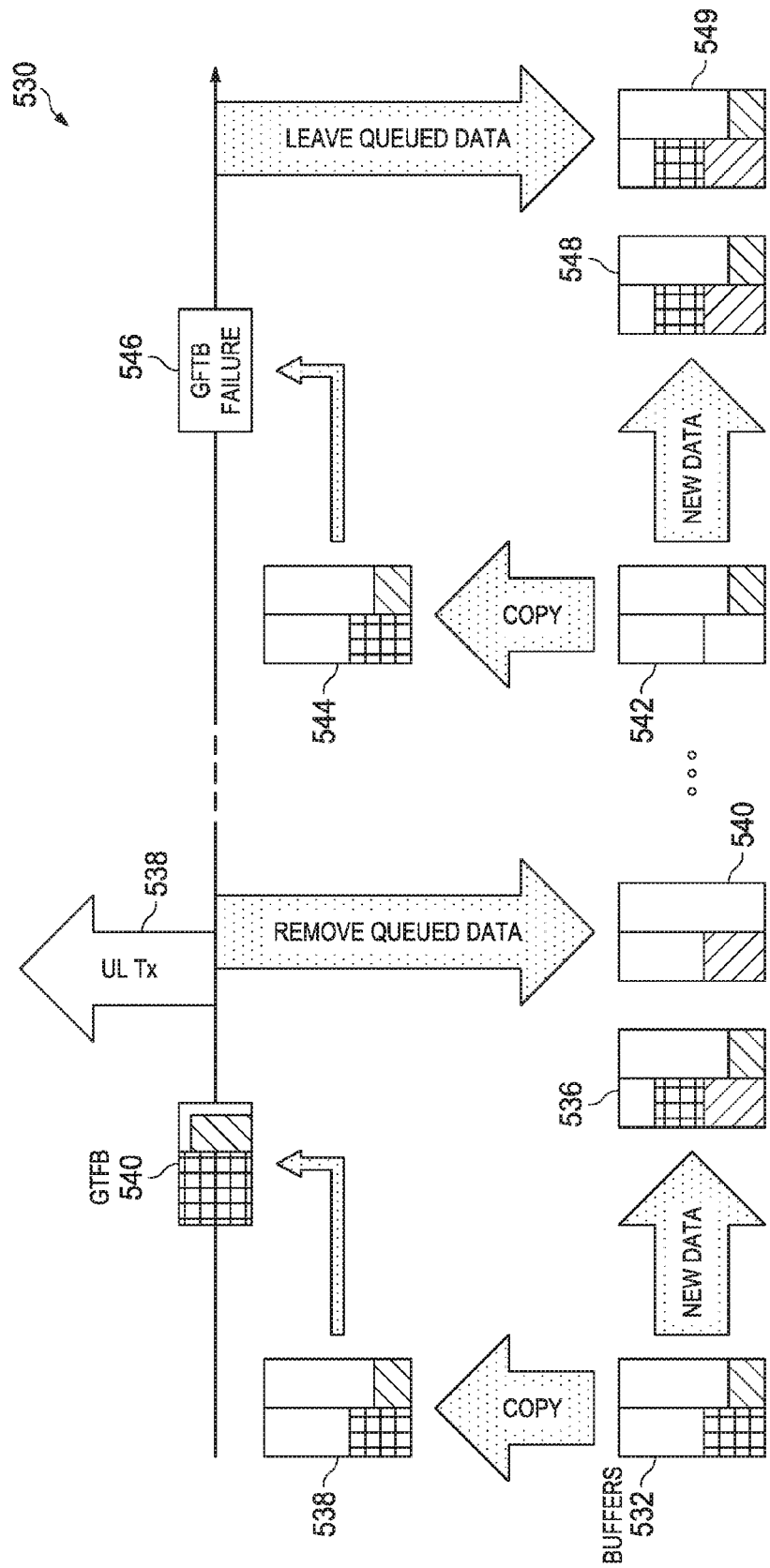
FIG. 6 illustrates grant free transport block (GFTB) success and failure associated with some embodiments.

FIG. 6 illustrates a GFTB procedure 530 where GFTB creation fails and succeeds according to some embodiments. GFTB success is on the left, and GFTB failure is on the right. In the case of GFTB success, data is in the original buffer 532. The original buffer 532 is copied to form a copy buffer 538. Data from the copy buffer 538 is placed in the GFTB 540. Meanwhile, new data arrives. The new data is placed in the original buffer 536 behind the original data. Uplink (UL) transmission 538 is performed on the data in the GFTB 540. The original data is removed from the original buffer 540 in response to the uplink transmission being performed.

Similarly, in the case of GFTB failure, data is in the original buffer 542. The original buffer 542 is copied to form a copy buffer 544. The UE attempts to place the data from the copy buffer 544 into the GFTB. However, there is GFTB failure 546. Meanwhile, new data arrives. The new data is placed in the original buffer 548 behind the original data. When the GFTB failure occurs, the copy buffer 544 is deleted. The original data remains in the original buffer 549 ahead of the new data.

Figure 7:
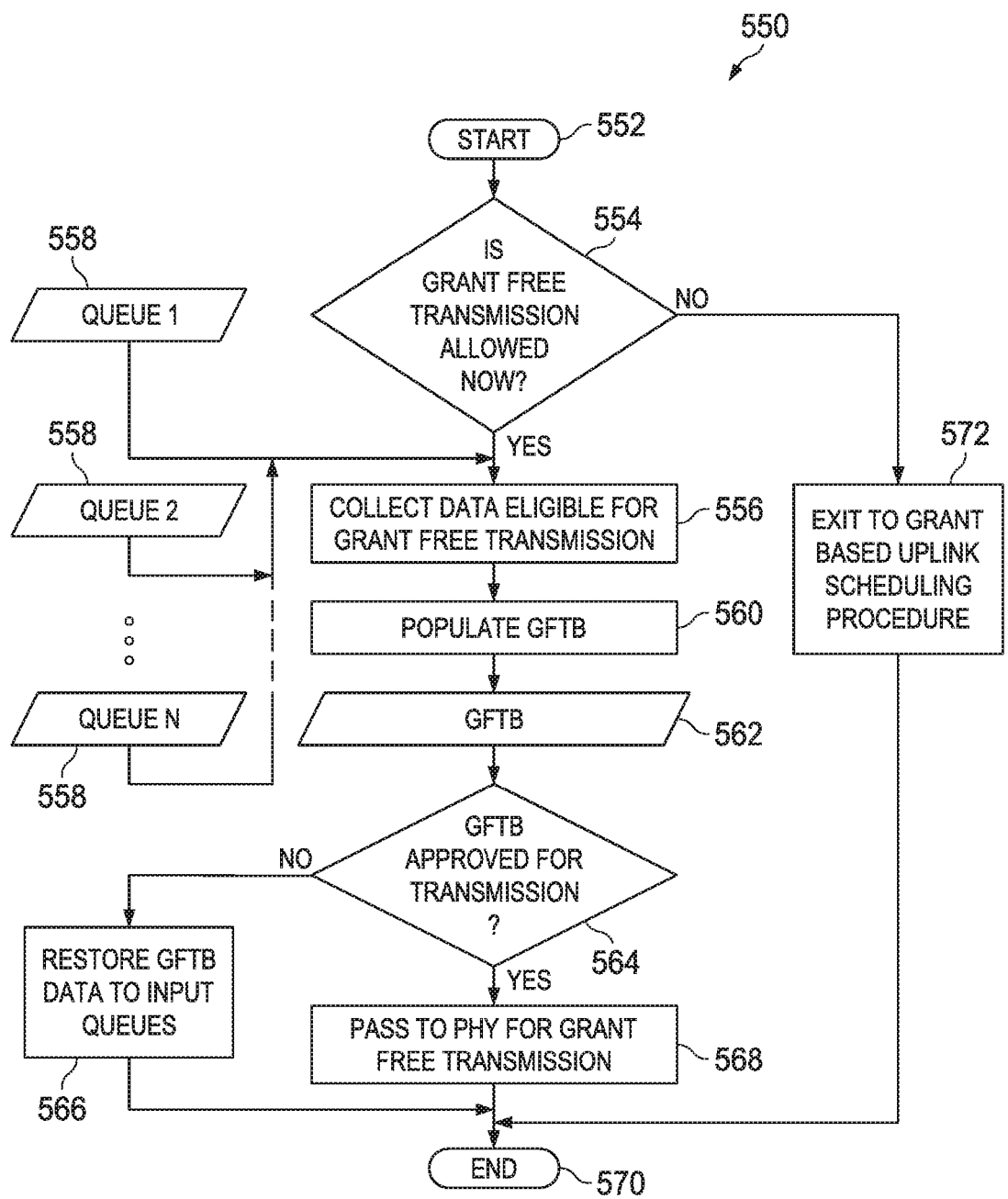
FIG. 7 illustrates a flowchart for an embodiment method of grant free uplink transmission.

FIG. 7 illustrates flowchart for an embodiment method of performing grant free transmission 550. Initially, the method begins in block 552.

Then, in block 554, the UE determines whether grant free transmission is currently allowed. Grant free transmission may be prohibited because of reliability criteria, a prohibition on grant free use by logical channels, or based on implementation criteria. The state of the uplink buffers may be considered in determining grant free transmission allowance. When grant free transmission is not currently allowed, the UE proceeds to block 572.

In block 572, the UE exits the method, and a grant based uplink scheduling procedure is performed. The method ends in block 570.

On the other hand, when grant free transmission is currently allowed, the UE proceeds to block 556. In block 556, the UE collects data eligible for grant free transmission. The data is collected from queues, for example from n queues 558.

In block 560, the UE populates the GFTB 562 from the eligible data. Data may be placed in the GFTB 562 when there is sufficient room in the GFTB 562 for the packets in the queue. In some embodiments, the GFTB is only populated when all of the contents of a queue can fit in the GFTB. In other embodiments, the GFTB is populated by only a portion of the contents of a queue.

In block 564, the UE determines whether the GFTB is approved for transmission. The GFTB may be approved for transmission when there is a grant free uplink opportunity. When the GFTB is approved for transmission, the UE proceeds to block 568.

In block 568, the UE passes the data from the GFTB to the PHY for grant free transmission. The method then ends in block 570.

On the other hand, when the GFTB is not approved for transmission, the UE proceeds to block 566, where the GFTB data is restored to the input queues. GFTB failure has occurred. Then, the method ends in block 570.

Figure 8:
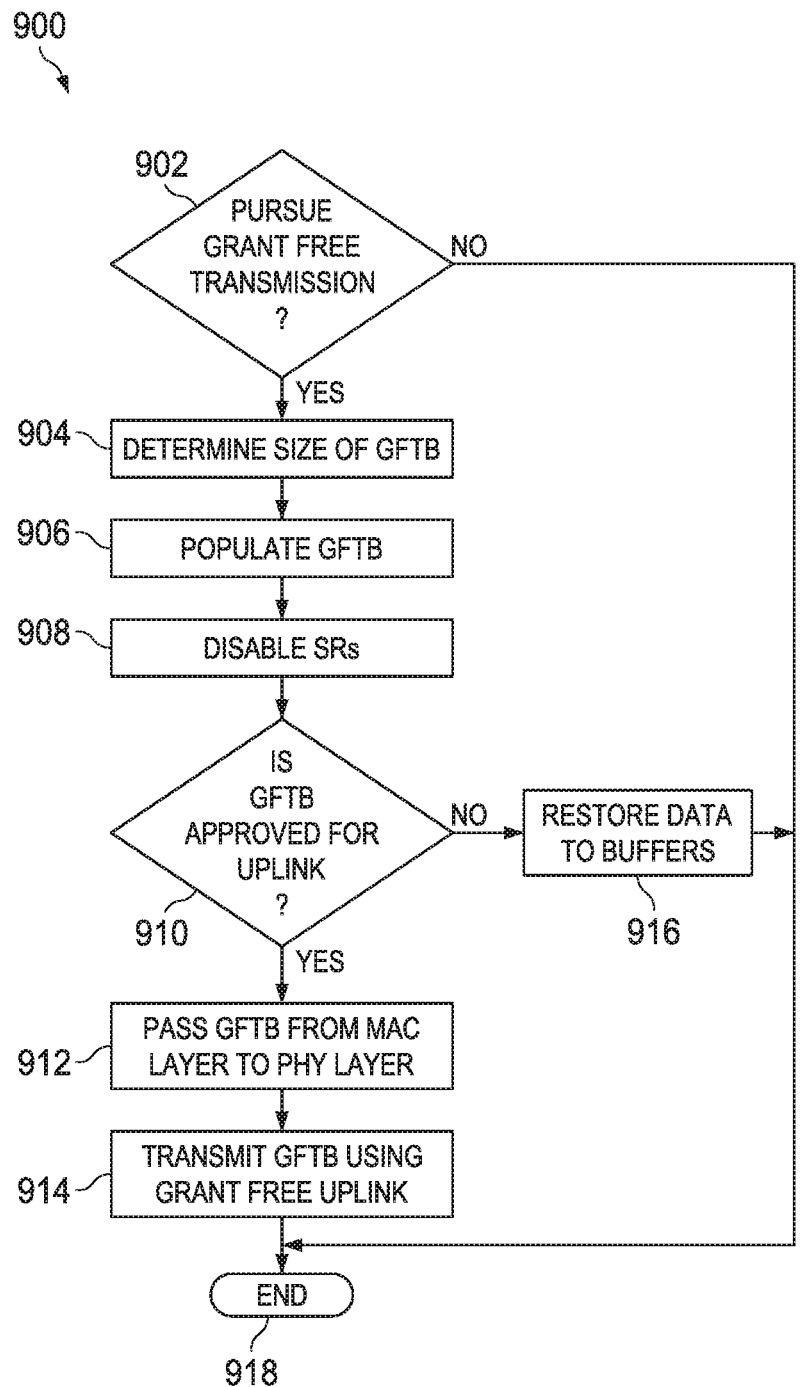
FIG. 8 illustrates a flowchart for another embodiment method of grant free uplink transmission.

FIG. 8 illustrates flowchart for an embodiment method of performing grant free transmission 900. Initially, in block 902, the UE determines whether to pursue grant free transmission. The UE may determine whether to pursue grant free transmission based on the size of the data for uplink. For example, the UE determines the size of the packets in the buffers. The size of the packets are added together to determine the total size of the packets in the buffer. The total size of the packets is compared to a threshold. The UE determines to pursue grant free transmission when the total size of the packets is less than or equal to the size threshold, and determines not to pursue grant free transmission when the total size of the packets is greater than the size threshold. Alternatively, when the total packet size is greater than the threshold, the UE decides to pursue grant free transmission on a portion of the packets. In an additional example, when deciding to pursue grant free transmission, the UE considers the time of the expected grant for grant based data transmission or the time of the next opportunity for grant free data transmission. When the time until the next opportunity for grant free data transmission is less than a threshold, the UE decides to pursue grant free data transmission, and when the time until the next opportunity for grant free data transmission is greater than or equal to the threshold, the UE decides not to purse grant free data transmission. When the expected next grant is soon, the UE decides not to pursue grant free data transmission, and when the expected next grant is not for a relatively long time, the UE decides to pursue grant free data transmission. For example, when the next grant is expected before the next grant free transmission opportunity, the UE decides not to pursue grant free transmission. In another example, the UE decides whether to pursue grant free data transmission based on a network policy. For example, a network policy might prohibit grant free data transmission on certain logical channels. When the UE decides not to pursue grant free transmission, the method ends in block 918.

When the UE decides to pursue grant free transmission, the UE determines the size of the GFTB in block 904. The size of the GFTB is determined based on the configuration of radio resources available for grant free transmission. The GFTB may be set to the size allotted to the next grant free transmission opportunity.

The UE populates the GFTB in block 906. Packets from the buffer are placed in the GFTB. In some examples, the buffers are copied, and packets from the copied buffers are placed in the GFTB.

In some embodiments, the UE disables scheduling requests after population of the GFTB begins in block 908. Disabling scheduling requests may prevent a grant based uplink opportunity from occurring before the next free uplink opportunity. In other examples, scheduling requests are not disabled, and block 908 is not performed.

After the GFTB has been populated, the UE determines whether the GFTB is approved for uplink transmission in block 910. For example, the GFTB is approved for uplink when there is a grant free transmission opportunity which is appropriately sized for the GFTB. The GFTB is not approved for uplink when there is no imminent grant free uplink opportunity.

When the GFTB is approved for uplink transmission, the GFTB is passed from the MAC layer to the PHY layer in block 912. Then, in block 914 the GFTB is transmitted using grant free uplink, and the method ends in block 918.

When the GFTB is not approved for uplink, the data is recovered, and restored to the buffer in block 916. In one example, the data is moved from the GFTB to the buffer. In other examples, the data in the GFTB is a copy of the data in the buffer, and the GFTB is discarded. Then, the method ends in block 918.

Figure 9:
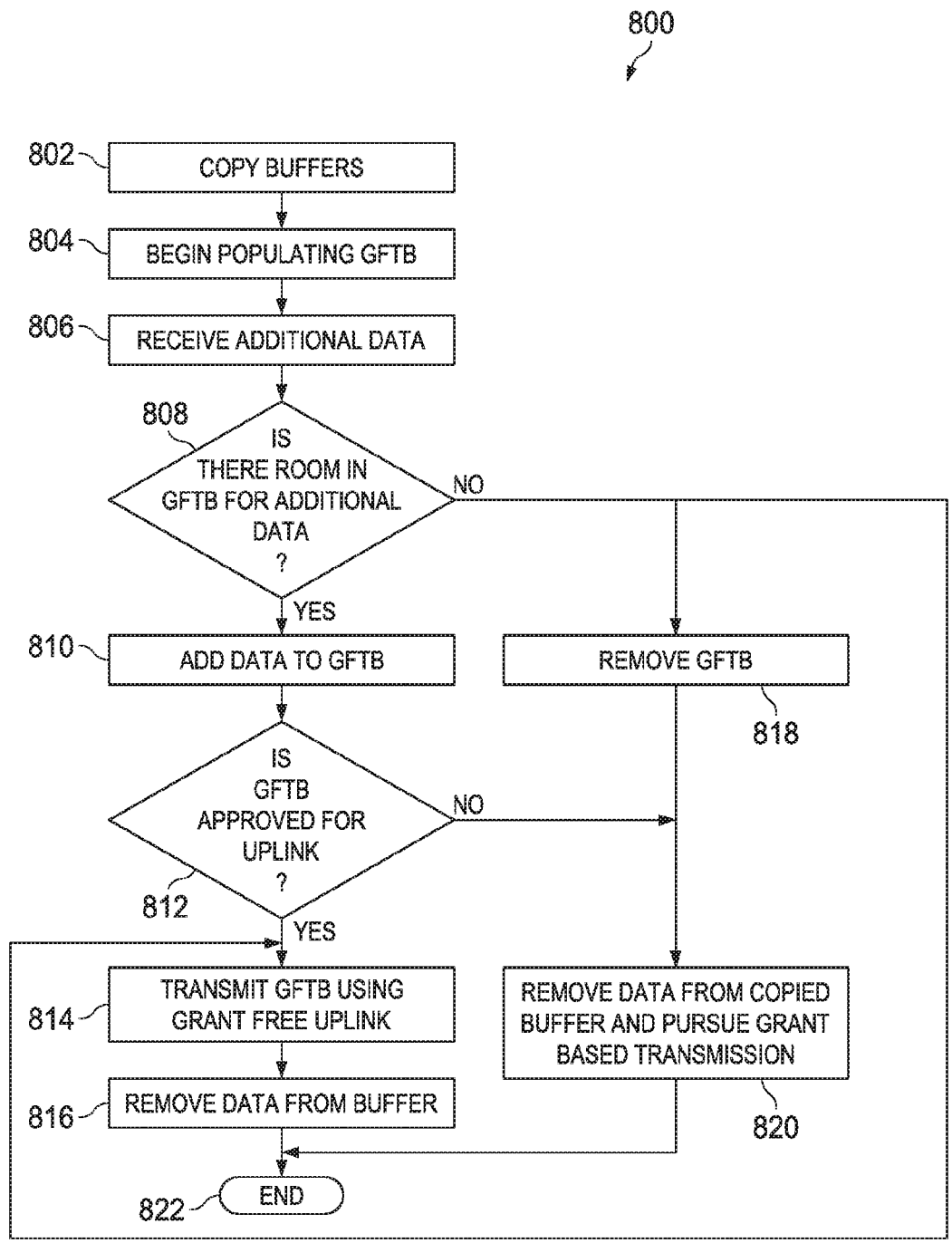
FIG. 9 illustrates a flowchart for an additional embodiment method of grant free uplink transmission.

FIG. 9 illustrates flowchart for an embodiment method of grant free data transmission 800. In the method 800, the UE has already decided to pursue grant free transmission.

In block 802, UE makes a copy of the buffers. The original data remains in the original buffer, and can be transmitted in grant based data transmission in the event that the grant free transmission fails, or when it is faster to use grant based transmission. The data in the copy of the buffer is used for grant free transmission.

The data from the copied buffer is used to begin populating the GFTB in block 804.

After beginning population of the GFTB, but before it is transmitted, the UE receives additional data for uplink transmission in block 806.

In block 808, the UE then determines whether there is sufficient room in the GFTB for the additional data. When there is not sufficient room in the GFTB for the additional data, the additional data is not added to the GFTB. In one example, GFTB transmission proceeds as normal in block 814, and the new data is dealt with separately, either with grant free transmission or grant based transmission. Alternatively, the data is removed from the GFTB in block 818, and the copied data is removed from the copied buffer in block 820. The data in the original buffer, including the original data and the additional data, is transmitted in a grant based transmission. The UE proceeds to block 814.

When there is sufficient room in the GFTB for the additional data, the additional data is added to the GFTB in block 810. The additional data may be copied into the copied buffer, and then loaded into the GFTB for grant free data transmission.

The UE determines whether the GFTB is approved for transmission in block 812. When the GFTB is not approved for transmission, the data is removed from the copy of the buffer in block 820. Grant based data transmission is performed on the data in the original buffer, and the method ends in block 822.

On the other hand when the GFTB is approved for uplink, the GFTB is transmitted using grant free uplink in block 814. The data from the original buffer is removed in block 816, and the method ends in block 822.

Figure 10:
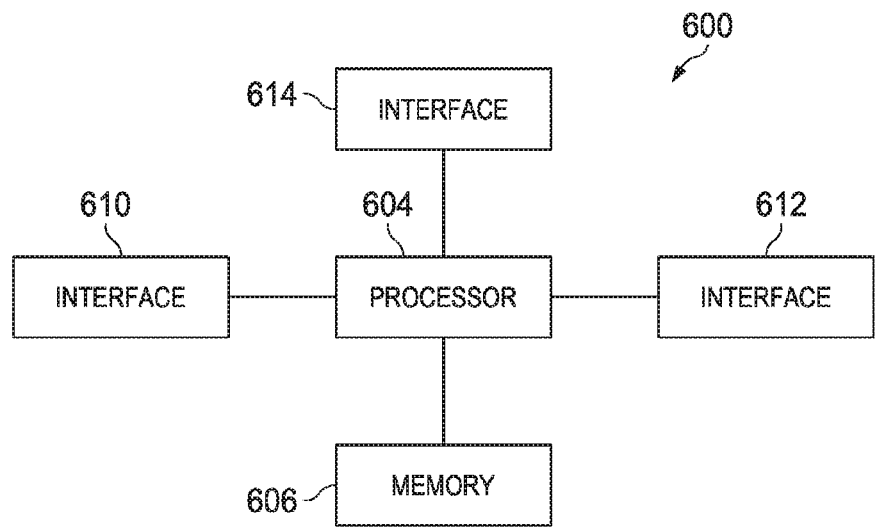
FIG. 10 illustrates a block diagram of an embodiment processing system.

FIG. 10 illustrates a block diagram of an embodiment processing system 60*o* for performing methods described herein, which may be installed in a host device. As shown, the processing system 60*o* includes a processor 604, a memory 606, and interfaces 610-614, which may (or may not) be arranged as shown in FIG. 10. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 60*o* to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 10, such as long term storage (e.g., nonvolatile memory, etc.).

In some embodiments, the processing system 600 is included in a network device that accesses, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
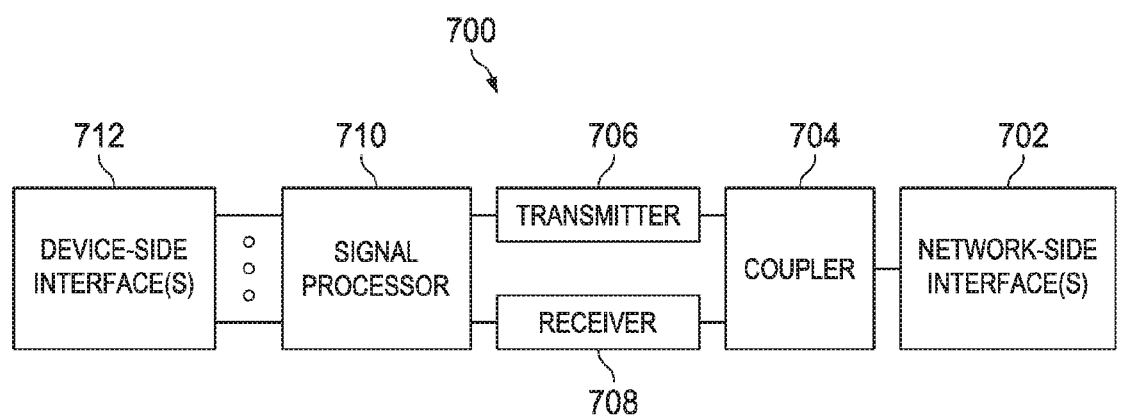
FIG. 11 illustrates a block diagram of an embodiment transceiver.

In some embodiments, one or more of the interfaces 610, 612, 614 connects the processing system 600 to a transceiver adapted to transmit and receive signaling over the telecommunications network. FIG. 11 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., LTE, etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   determining a size of a grant free transport block (GFTB) based on a configuration of radio resources available for grant free transmission, upon determining to pursue grant free transmission on first data of a first buffer of at least one buffer based on a size of at least one packet in the first buffer;
   selecting the first data to be disjoint from second data of a second buffer of the at least one buffer, upon determining not to pursue grant free transmission on the second data;
   populating the GFTB with the first data from the first buffer to produce a populated GFTB; and
   transferring, by a user equipment (UE), the populated GFTB from a media access control (MAC) layer to a physical layer (PHY).

2. The method of claim 1, further comprising:
   transmitting, by the UE, the populated GFTB using grant free uplink upon determining that the populated GFTB is approved for grant free transmission.

3. The method of claim 1, further comprising:
   wherein determining not to pursue grant free transmission on the second data comprises accessing that grant free transmission is prohibited for the second data of the second buffer of the at least one buffer, the method further comprising:
   retaining the second data in the second buffer until determining whether the populated GFTB is approved for grant free transmission.

4. The method of claim 1, wherein determining to pursue grant free transmission comprises:
   determining a plurality of sizes of packets in the at least one buffer;
   summing the plurality of sizes of the packets to produce a total packet size;
   comparing the total packet size to a size threshold; and
   determining to pursue grant free transmission upon determining that the total packet size is less than or equal to the size threshold.

5. The method of claim 1, further comprising determining to pursue grant free transmission on a subset of packets in the at least one buffer.

6. The method of claim 1, wherein determining to pursue grant free transmission comprises assessing that a period of time before an expected grant for data transmission is greater than a period of time until a next grant free transmission opportunity.

7. The method of claim 1, wherein determining to pursue grant free transmission comprises assessing that a minimum time before the next available occasion for requesting a grant for data transmission is greater than a threshold.

8. The method of claim 1, further comprising disabling scheduling requests (SRs) from a time of beginning populating the GFTB to a time of transmitting the GFTB.

9. The method of claim 1, further comprising:
   receiving additional data between populating the GFTB and transmitting the populated GFTB; and
   adding the additional data to the GFTB.

10. The method of claim 1, wherein determining to pursue grant free transmission comprises assessing a network policy.

11. The method of claim 1, further comprising copying the at least one buffer to produce at least one copied buffer, wherein populating the GFTB comprises populating the GFTB from the first data of the at least one copied buffer.

12. The method of claim 11, further comprising deleting the at least one copied buffer upon GFTB failure.

13. The method of claim 1, further comprising removing the first data from the first buffer upon transmitting the GFTB.

14. A user equipment (UE) comprising:
   a memory storage comprising instructions; and
   one or more processors in communication with the memory, wherein the one or more processors execute the instructions to:
   determine a size of a grant free transport block (GFTB) based on a configuration of radio resources available for grant free transmission, upon determining to pursue grant free transmission on first data of a first buffer of at least one buffer based on a size of at least one packet in the first buffer;

select the first data to be disjoint from second data of a second buffer of the at least one buffer, upon determining not to pursue grant free transmission on the second data;

populate the GFTB with the first data from the first buffer to produce a populated GFTB; and transfer the populated GFTB from a media access control (MAC) layer to a physical layer (PHY).

15. The UE of claim 14, wherein the one or more processors execute the instructions to:

transmit the populated GFTB using grant free uplink upon determining that the populated GFTB is approved for grant free transmission.

16. The UE of claim 14, wherein the one or more processors execute the instructions to:

determine not to pursue grant free transmission on the second data comprises assessing that grant free transmission is prohibited for second data of a second buffer of the at least one buffer, wherein the instructions further comprise instructions for:

retain the second data in the second buffer until determining whether the populated GFTB is approved for grant free transmission.

17. The UE of claim 14, wherein the one or more processors execute the instructions to determine to pursue grant free transmission comprise instructions to:

determine a plurality of sizes of packets in the at least one buffer;

sum the plurality of sizes of packets to produce a total packet size;

compare the total packet size to a size threshold; and determine to pursue grant free transmission upon determining that the total packet size is less than or equal to the size threshold.

18. The UE of claim 14, wherein the one or more processors execute the instructions to:

receive additional data between populating the GFTB and transmitting the populated GFTB;

add the additional data to the GFTB.

19. The UE of claim 14, wherein the one or more processors execute the instructions to copy the at least one buffer to produce at least one copied buffer, wherein the instructions for populating the GFTB comprise instructions for populating the GFTB from the first data of the at least one copied buffer.

20. A non-transitory computer readable storage medium storing computer instructions that when executed by one or more processors, cause the one or more processors to perform the steps of:

determine a size of a grant free transport block (GFTB) based on a configuration of radio resources available for grant free transmission, upon determining to pursue grant free transmission on first data of a first buffer of at least one buffer based on a size of at least one packet in the first buffer;

select the first data to be disjoint from second data of a second buffer of the at least one buffer, upon determining not to pursue grant free transmission on the second data;

populate the GFTB with the first data from the at least one buffer to produce a populated GFTB; and transfer the populated GFTB from a media access control (MAC) layer to a physical layer (PHY).

* * * * *